May 30, 1944.   J. SUNNEN   2,349,890
PISTON EXPANDER
Filed Sept. 4, 1942   2 Sheets-Sheet 1
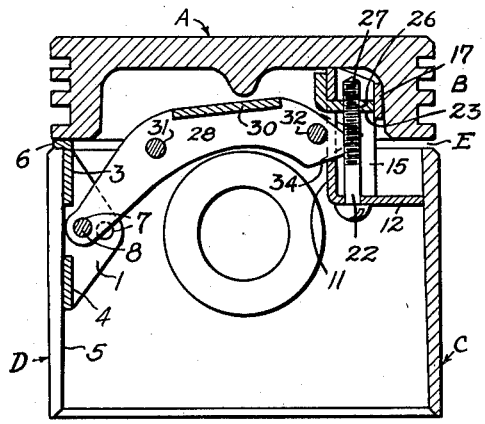
Fig. 1.
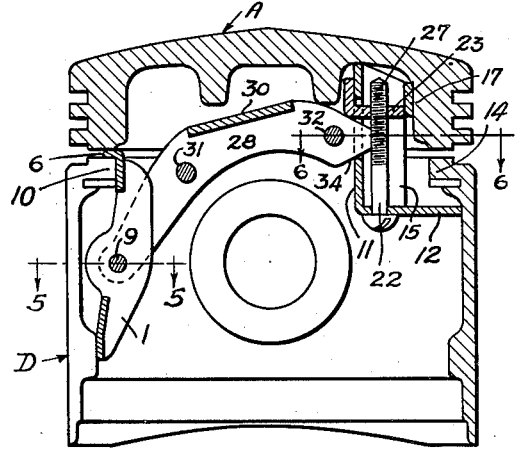
Fig. 2.
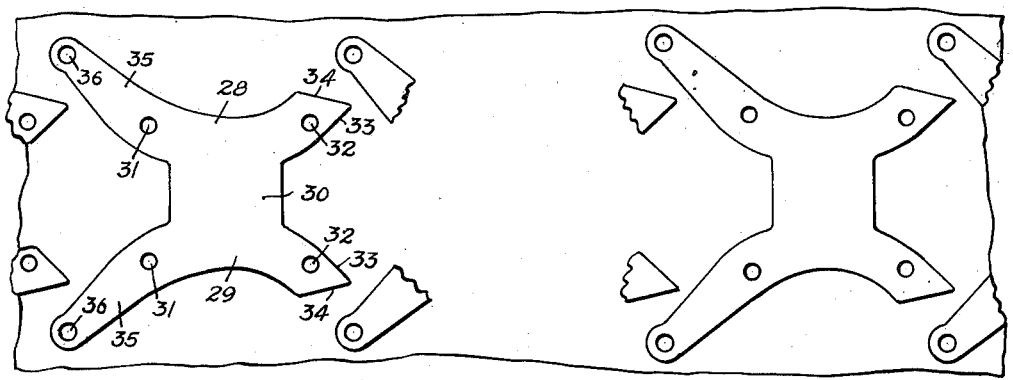
Fig. 3.
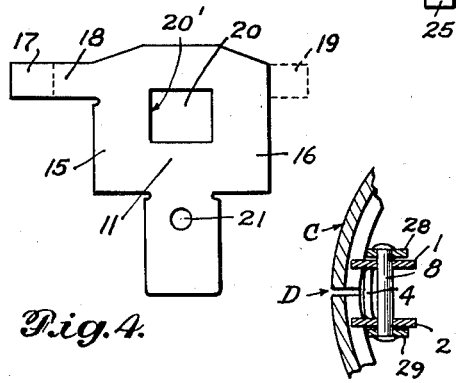
Fig. 4.
Fig. 5.
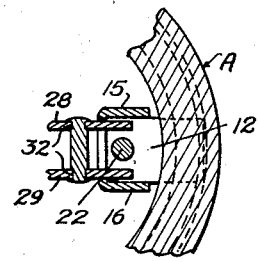
Fig. 6.
Fig. 13.
INVENTOR
Joseph Sunnen
BY
George R. Ericson
ATTORNEY May 30, 1944. J. SUNNEN 2,349,890
PISTON EXPANDER
Filed Sept. 4, 1942 2 Sheets-Sheet 2

INVENTOR
Joseph Sunnen,
BY
ATTORNEY

Patented May 30, 1944

2,349,890

UNITED STATES PATENT OFFICE 2,349,890

PISTON EXPANDER

Joseph Sunnen, Clayton, Mo., assignor to Cornelia Sunnen, Clayton, Mo.

Application September 4, 1942, Serial No. 457,349

20 Claims. (Cl. 309—12)

This invention relates to piston expanders of that type capable of a fixed adjustment, i. e., in which a predetermined adjustment of the diameter of a piston can be made without the probability of a subsequent variance of the adjustment due to inherent resiliency of the parts involved.

One of the main objects of this invention is to provide a piston expander so constructed and arranged as to permit extremely accurate adjustment of the piston to which it is applied without removing the wrist pin or connecting rod therefrom.

Another object resides in the provision of means for simultaneously expanding the piston and locking the expanding mechanism in place without, in any manner, altering the structure of the piston to which it is applied.

The invention further comprehends the use of an assembly in which the solid unyielding inner face of the piston head forms the fixed point from which forces are diverted in a proper direction to apply lateral pressure at spaced points within the split skirt through means readily accessible and capable of accurate adjustment.

Other objects will more clearly hereinafter appear by reference to the accompanying drawings and specification, including the capacity of the present invention to effectively expand the circumferential dimension of the skirt of a piston by pressure applied at points properly positioned with respect to the wrist pin bosses, the utilization of the expanding forces to secure the assembly against the vibration on dislodgment, the provision of means whereby the device may be applied to pistons of different types or sizes, and the capacity of interchange of parts whereby commercial utilization is facilitated.

In the drawings,

Figure 1 is a vertical sectional view of a piston having one form of my improved piston expander installed.

Figure 2 is a similar view showing a modified form of anchor plate.

Figure 3 is a plan view illustrating the method of forming the arm from a single blank.

Figure 4 is a plan view showing the blank from which the brace is constructed.

Figure 5 is a transverse section on line 5—5 of Figure 2.

Figure 6 is a transverse section on line 6—6 of Figure 2.

Figure 13 is a plan view of the adjusting angle plate.

Figure 7:
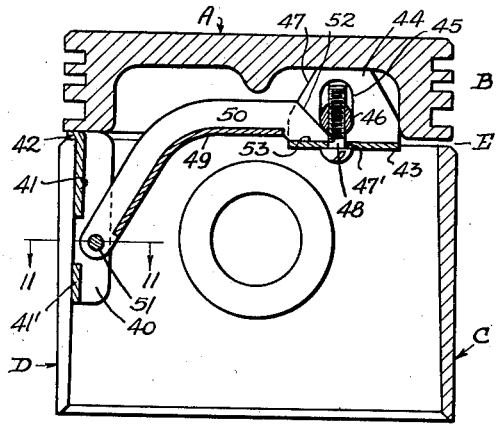
Figure 7 is a vertical sectional view of a piston showing a modified view of my expander installed.

In illustrating the present invention in its various modifications, I have shown conventional types of pistons, each of which may embody the head portion A provided with the ring belt B and the skirt C, the latter being formed with the usual vertical slot D and horizontal slots E to provide for the expansion and contraction due to variations in the engine temperature. It will be noted that where the inner wall of the skirt varies in contour and construction, it is necessary that the anchor plate forming a part of the present invention be correspondingly modified to permit firm seating, which is essential to the application of the expansive forces developed by the utilization of the invention. The variations in the construction of the anchor plate will be more fully hereinafter described.

Referring now to Figures 1 and 2 of the accompanying drawings, there is illustrated a form of the invention which may probably be considered as a preferred adaptation of a structure embodying the present teachings. In these figures, similar reference characters will be applied to corresponding parts, except in the instance of the anchor plate shown in Figure 2 which is somewhat modified. Broadly, there are three main elements, i. e., the anchor plate, fixedly secured to the expansible skirt of the piston, the bracket, which engages the piston head and adjacent skirt portion, and the interposed arm or link by virtue of which the necessary forces are transmitted to the diametrically opposed faces of the piston skirt for expanding the same, and to the head of the piston for securing the assembly in position. In Figures 1 and 2, the anchor plate is formed to include spaced side walls 1 and 2 (see Figure 5) and spaced connecting webs 3 and 4, the webs providing contacting surfaces for abutting the adjacent inner face 5 of the piston skirt for applying expansive forces thereto. The upper marginal edge portions of the upper web members 3 of the anchor plates are flanged outwardly at 6, and these flanges are designed to seat in the horizontal circumferential slots E between the head and skirt of the piston. In Figure 1, the side walls 1 and 2 are provided with aligned openings 7 for receiving the pivot pin 8 of the arm to connect these parts together. In this figure, there is shown a plurality of these openings which will permit relative adjustment between the arm and the plate and modification of the structure for use in pistons of different diameter. In Figure 2, a single pin mounting is illustrated at 9, although in this form as in Figure 1, a series of openings can be provided to permit adjustment, if desired. In Figure 2, the upper web is substantially offset inwardly from the lower web to accommodate the relatively thickened portion 10 of the piston shown in this view. At the same time, the side walls are relatively widened intermediate their length and at points approximating the area forming the pin support 9 to reinforce the structure and to properly position the pivotal connection of the arm, so as to bring about a satisfactory distribution of pressure to the side wall, whereby uniform expansion is made possible.

The bracket member shown in Figures 1 and 2 is identical in both instances. This bracket is formed from a blank suitably bent to L form to provide an inner upright wall 11 and horizontal outwardly extending bottom portion 12, the latter extending at substantially right angles to the upright wall and engaging the inner face of the skirt, as clearly shown. The upper edge of the upright wall portion 11 abuts against the inner face of the head portion A of the piston. In the figures now being described, the piston head is modified to illustrate two conventional types; however, in both of these forms, the arrangement of the bracket with respect to the piston head and skirt is substantially identical. In Figure 2, the upper marginal portion 14 of the skirt of the piston is shown relatively thick, and this variation in the skirt structure may necessitate a longer bottom or base plate 12 in order to properly seat the bracket to insure a suitable arrangement of the parts. Side walls 15 and 16 are formed by bending the wings of the central upright plate 11 outwardly at substantially right angles, as will be more clearly shown by an examination of Figure 4.

In Figure 4, the blank from which the bracket is formed is illustrated as having at the upper portion of one of the wings, an arm 17 which is bent to a position substantially parallel to the upright wall 11 and forms a contacting element for engaging the vertical inner wall of the piston head. This contacting element may be otherwise formed, as, by projecting from each wing 15 and 16, the two arms 18 and 19, each of which will comprise one-half of the contacting element. In the event of the use of these shortened contacting elements, they will be bent to occupy the same position and arrangement as when the single arm 17 is utilized. The upright inner wall 11 is cut out to provide a substantially square slot 20 for receiving the end portion of the interposed arm or brace and permitting the movement of this part. An opening 21 is formed in the base angle 12 to permit insertion of a screw bolt 22 which is threaded into and operates the adjustable angle member or follower which is used to apply the necessary force to the arm or link for expanding the skirt of the piston.

This adjustable angle member shown in Figure 13 is formed from a blank of substantially T form and includes the body portion 23 and the wings 24 and 25, the body portion 23 being of a width to slide freely between the vertical walls 20' defining the opening 20 in the upright plate 11, and the wings being sufficiently wide to extend laterally of this opening to engage the outer face adjacent the slot to guide the part in its movement.

A threaded opening 26 is formed at such a position in the body of the angle member as to align with the opening 21 in the bottom plate 12 of the bracket member, so as to permit insertion of the screw 22 and engagement between the screw threads 27 and the threads of the opening 26, whereby the turning of the screw will move the angle member vertically with respect to the plate 11 to secure the adjustment of the arm or brace.

The arm or link, which constitutes an operative connection between the anchor plate and the bracket is, in effect, a brace element when the parts are properly and relatively adjusted. This arm or link is shown constructed in a number of different forms; however, in Figures 1 and 2, substantially the same element is utilized. In Figure 3, the blank from which this arm or link is formed is clearly illustrated, and it will be apparent from an inspection of this figure that these blanks can readily be stamped from a strip of metal and then bent to the proper form, as illustrated. The arm comprises spaced side walls 28 and 29 connected by the web portion 30. The side walls are of general arcuate form to create an arched assembly capable of free insertion and removal within a piston without interference with the wrist pin and wrist pin bosses or the head of the connecting rod on the wrist pin. The amount of clearance provided by the arcuate shape of the side walls may vary according to the type and construction of the piston, it being essential, in each instance, that the shape provide ample clearance between the head of the piston and the pin and boss assembly, so that movement of the arm or link in the plane of the axis of the piston be permitted from the neutral position at which it should be initially inserted. It will be noted that the blank from which the arm is constructed is so shaped that the web portion 30 will lie in substantially a single plane, this feature inherently providing greater clearance between the arm and the central inner portion of the piston head. In the illustrated form of the arm and arm blank shown in Figures 1 and 2, there are perforations 31 and 32 at each side of the web 30. These perforations permit the use of cross braces or rivets to add rigidity to the structure. The use of this form of brace is not important in the event that the material utilized in the assembly has sufficient inherent strength to accomplish the purposes for which it is designed. It will be apparent that if the stock from which the element is formed is of sufficient gauge, then, cross bracing will be nonessential. Extending forwardly from the web 30, the side walls project downwardly with their upper edges 33 inclined at such an angle as to form a proper contacting surface for engaging the working face 24 of the follower shown in Figure 13, to furnish pressure to the anchor plate and bracket for the lateral expansion of the piston skirt. The angle of inclination of the faces 33 will vary according to the relative proportion of the parts and their arrangement within a piston, it being essential that the direction of the forces applied for the purpose of expanding the piston be uniformly dispersed in diametrically opposed directions, and that freedom of movement be available for this purpose. The underface 34 should be finished at such an angle that there can be relative movement between this face and the adjacent face of the bracket and the adjacent faces of the follower and incline faces 33. It might be stated that these faces 33 and 34 are designed so that when cooperating with their associated parts, they provide a wedging action exerting forces in the direction of the upper edge of the side wall of the piston head and between opposed points in the piston as defined by the anchor plate and the point of engagement between the horizontal plate 12 of the bracket and the skirt so as to inherently urge the bracket into locked position and simultaneously expand the piston skirt. The rearwardly elongated legs 35 of the blank which connect with the anchor plate, are perforated at 36 adjacent their extremities to receive the pin 8 which projects into the porforation 7 in the side walls 1 and 2 of the anchor plate.

In assembling the form of the invention shown in Figures 1 and 2, the anchor plate carrying the arm or link is inserted into position, so that the inner extremities of the arm seat within the slot 20 of the bracket, the latter having been inserted into position by a suitable device, as will be apparent to one skilled in the art. In inserting the arm, the follower or pressure plate of Figure 13 is raised to provide clearance for the inner end portion of the arm and to permit lateral movement of the arm amply to insure insertion of the flange 6 within the horizontal slot of the piston. The screw 22 is then turned to move the follower or pressure plate into contact with the inclined faces 33 of the arm, this movement causing firm engagement of the bracket with the head of the piston and lateral movement of the bottom plate 12 of the bracket against the piston skirt simultaneously with the lateral movement of the anchor plate. As previously stated, the coacting working faces between the bracket, follower, and the angular faces at the adjacent end of the arm are such as to properly permit necessary adjustment to efficiently lock the bracket against the piston head to form a fixed point from which pressure is applied to the inner walls of the skirt.

Figure 8:
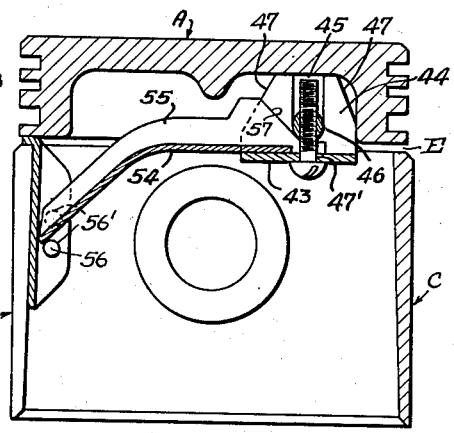
Figure 8 is a vertical sectional view showing a modification of that form of the invention illustrated in Figure 7.

In Figures 7 and 8, the modifications are substantially analogous, except as to details of construction. In Figure 7, the anchor is formed with its side walls 40 extending the full length of the vertical edges of the connecting web portions 41 and 41', which latter are spaced to provide clearance for pivotal movement of the arm or link. The upper edge of the side walls 40 terminate flush with the upper face of the horizontal flange 42 and abut the lower face of the adjacent piston head, thus, providing a compact interlocking of parts when the flange is seated in the slot E of the piston.

The bracket member in both of the forms shown in Figures 7 and 8 is of substantially U-form, each including a base portion 43, and the spaced upwardly extending side walls 44 having formed therein vertical guide slots 45. In Figure 8, these slots extend upwardly through the upper marginal edge of the wall, so that the follower pin 46 can be more readily inserted. The follower pin 46 extends the full width of the side walls 44, and the ends of the pin 46 engage the vertical side walls of these slots 45, so as to be guided in the movement as will more clearly hereinafter appear. It will be noted that the upright walls 44 are cut away along their outer vertical edges, as at 47, to provide essential clearance for adjustment and insertion or removal. The base 43 of the bracket is perforated at 47' to receive the screw 48, which is threaded through the follower pin 46, as clearly shown. By this arrangement, the pin 46 is guided in its vertical movement and secured against lateral movement during adjustment of the parts.

The arm structures in the modifications of Figures 7 and 8 are of channel form. In Figure 7, the arm includes the web 49 and side walls or flanges 50, the web terminating short of the end portion of the flanges 50. These flanges are perforated at one end to receive the pivot pin 51 which extends through the side walls 40 of the anchor plate. At the other end of the arm, the side walls or flanges 50 are formed with upper inclined faces 52 and also horizontal faces 53, the latter lying in a plane below the under surface of the web 49 and being adapted to rest upon the upper face of the base member 43, while the inclined faces 52 of this base member engage the follower pin 46. It will be apparent that adjustment of the pin 46 by the screw 48 will move the arm 50 to cause the expansion of the skirt and the clamping of the bracket in its position against the inner face of the piston head.

In Figure 8, the web 54 of the arm, at the outer end which engages the anchor plate, extends to the outer extremities of the side walls or flanges 55 and seats upon the transverse pin 56 extending between the side walls of the anchor plate. The side walls of the anchor plate are shown with a series of vertically arranged aligned perforations 56', so arranged that the pin 56 may be positioned in a manner suitable to permit the assembly to accommodate various piston sizes. The inner end of the arm in Figure 8 has the web projected a sufficient distance to substantially overlie and seat upon the base 43 of the bracket. The inclined face 57 of the arm in this modification is positioned inwardly of the end of the arm and is inclined, as in the form of Figure 7, to receive pressure from the follower pin 46. The extremity of the arm is reduced and shaped to seat the pin in its lowermost position. This modification provides a substantial seating of the inner end of the arm and insures proper functioning of the outer end on its pin 56, the increased base structure providing additional seating at the point of connection with the anchor plate.

Figure 9:
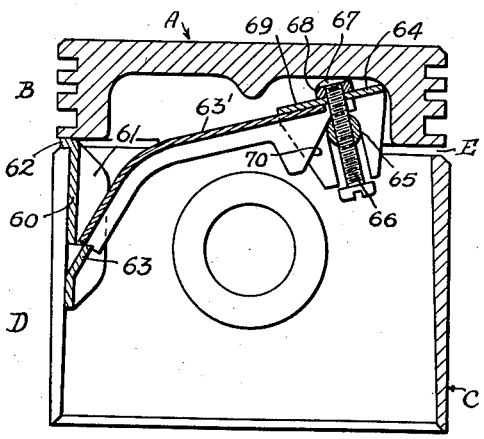
Figure 9 is a vertical sectional view showing the bracket reversed and the anchor plate formed as an integral structure.

In Figure 9, the anchor plate includes the central wall portion 60 and the spaced side flanges 61, the wall portions in this form, as in all other forms, being of such contour as to neatly seat against the inner face of the piston skirt. As in previous figures, the upper outwardly extending flange 62 engages in the circumferential slot of the piston immediately below the piston head, and thus anchors the structure. The upright center wall portion 60, intermediate the side wall 61, is struck out to form the inwardly projecting arm support 63, upon which the arm 63' or brace is seated. The arm in the present modification is of channel form, being structurally identical with the arm of Figure 8. The bracket is likewise substantially identical with the bracket of Figure 8, being inverted in the same manner as the arm 63', so that the base flange 64 seats at the junction of the upper inner head face and the inner vertical head face. In order to provide for the adjustment of the pin 65, a screw 66 is headed at its upper extremity 67, and this head rests upon the washer 68 seated upon the outer or upper face 69 of the base of the inverted U member. Thus, by the rotation of the screw 64, the pin 65 is moved to cam the inclined face 70 of the arm laterally to urge the anchor plate outwardly to expand the skirt.

The follower member carried by the anchor plate in each of the modifications is designed to contact an inclined surface of the arm to expand the piston skirt and wedge the bracket securely in position. The direction of the expansive force caused by the adjustment of the follower is obviously determined by the pitch of the contacting inclined faces of the arm, and, for this reason, it is essential that the pitch of these faces be determined in order to apply the forces in a direction securing maximum performance. In the forms involving bracket structures which overlie and engage the skirt, the direction of the forces must be such as to cause the portion of the bracket contacting the inner wall of the cylinder head to be diagonally opposed to the pivotal connection between the lower end of the arm and the anchor plate, so as to cause the bracket to be locked into fixed position within the cylinder head. From the relatively rigid point of engagement between the bracket and the cylinder head, the forces must be distributed so as to cause lateral expansion between two points of the skirt as defined by the anchor plate and the depending portion of the bracket.

Figure 10:
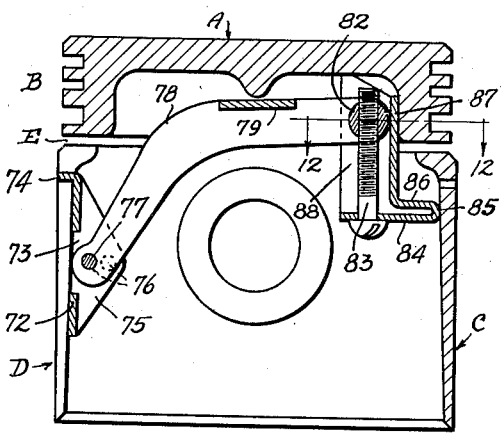
Figure 10 is a vertical sectional view of an additional modification showing the bracket modified to engage the skirt of the piston as in Figures 1 and 2.
Figures 11, 12:
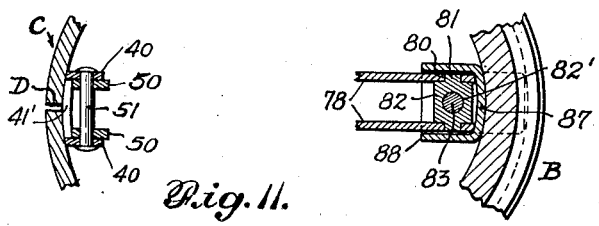
Figure 11 is a transverse section on line 11—11 of Figure 7.
Figure 12 is a transverse section on line 12—12 of Figure 10.

In Figure 10, the modification utilizes substantially the same anchor plate as shown in Figure 1, this anchor plate having a vertical wall portion 72 cut away at 73 to provide clearance for movement of the lever extremity and upper lateral flange 74 for seating in the horizontal slot in the piston wall. Spaced side plates or wings 75 are provided with pairs of aligned pin openings 76 for receiving the pin 77 connecting the spaced side walls 78 of the arm. The web 79 connects the side walls 78 of the arm and may extend a distance suitable for providing the essential rigidity to the structure and for applying the necessary forces for expanding the piston skirt. The inner end of the arm is formed with aligned openings 80, as shown in Figure 12, which receive the reduced end portions 81 of the cylindrical pin 82. The pin 82 is formed with a vertically threaded opening 82' through which extends the adjusting screw 83, the latter being positioned between the side walls of the bracket and extending through the bottom plate thereof. The bracket in this modification includes the base plate 84, which is sufficiently wide to engage the offset skirt wall at 85, and this base plate is bent upwardly and inwardly to form the overlying portion 86 which terminates at a point defined by the inner face of the piston head. The plate is then bent upwardly at substantially right angles to the base plate to provide an upright wall 87 which engages within the inner face of the cylinder wall. Winged extensions from the upright wall 87 are bent inwardly to form the side walls 88, which guide the pin 80 and arm extremity during adjustment. The opening in the bottom plate of the bracket is in alignment with the vertically threaded opening 80 in the pin. By this arrangement, the rotation of the bolt 83 will cause a vertical movement of the upper extremity of the arm 78 and will create diagonal and lateral forces for clamping the bracket in position and for expanding the piston at diametrically opposed points.

From the foregoing, it will be apparent that the piston expander forming the subject matter of the present application accomplishes many desirable functions and yet comprehends a structure in which an accurate adjustment of the piston skirt may be made without the possibility of subsequent modification of this adjustment due to vibrational movements present under operating conditions. The three main features of the assembly can be interchanged to permit use of modifications particularly designed for special piston constructions. It is well known that pistons are made in different forms and sizes, so that it is necessary to anticipate combinations providing various degrees of clearances between the wrist pin, wrist pin bosses, and the irregular interior wall structure of both the piston head and the piston skirt. Regardless of the combination used, i. e., the combination of the anchor plate, brace arm and bracket, the insertion of the device in a piston without removing the wrist pin and connecting rod may readily be accomplished, and after the insertion, the follower which applies the bracing and expanding forces both diagonally and laterally can be easily and accurately adjusted by simply turning the screw or bolt designed in each modification for this purpose. It is not contemplated that the present application should define every form embodying the inventive thought, but rather that the disclosure of this application should be illustrative of the development. It will be readily apparent to one skilled in the art that additional forms of anchor plates and brackets and connecting arms could be comprehended without departing from the scope of the invention.

It will be noted that certain modifications show the bracket only engaging the head of the piston, so that the expansion of the skirt is from a single fixed point. In this form of the invention, the expanding force caused by the wedge action of the follower on the arm extends diagonally of the piston and inherently clamps the bracket and expands the skirt simultaneously. It will be apparent to one skilled in the art that an accurate adjustment of the skirt can be had by this arrangement, which is not the case in instances where the arcuate brace or arm is made of extremely resilient material.

I claim:

1. An expander for a piston having a head and an expansible skirt, said expander including an anchor plate for fixed association with said expansible skirt, an arm pivotally associated at one end with said anchor plate, said arm extending diagonally to an opposed point in the piston head and being bent intermediate its length to lie adjacent the inner faces of said head for a portion of its length, a bracket engaging the piston head adjacent the upper end of said arm, and a member carried by said bracket and adjustable in the direction of the length of the piston for engaging the end of said arm to cause the same to have a rectilinear movement against the anchor plate for expanding the skirt of the piston.

2. An expander for a piston having a head and an expansible skirt portion, said expander including an anchor plate fixedly positioned against the skirt of the piston, a diagonally extending arm pivotally associated with the anchor plate at its lower end, a bracket, a follower plate carried by said bracket, said follower plate including a portion engaging the upper end of said arm and guide portions associated with said bracket, and means for adjusting said follower plate to move said arm laterally to expand said skirt.

3. An expander for a piston having a head and an expansible skirt portion, said expander including an anchor plate fixedly positioned against the skirt of the piston, a diagonally extending arm pivotally associated with the anchor plate at its lower end and having an inclined face at its upper end, a bracket, a follower plate carried by said bracket, said follower plate including a portion for engaging the inclined face at the upper end of said arm and guide portions associated with said bracket, and means for adjusting said follower plate.

4. A piston of the type having a wrist pin mounting and a skirt expander, said expander comprising a relatively rigid arm, wall engaging elements at each end of the arm, each of said wall engaging elements having portions constructed and arranged to provide a seat for the adjacent end of said arm, and being provided with portions adapted to contact the piston at points on opposing sides of said seat, and means carried by one of the wall engaging elements for adjusting said seat to move said arm in the direction of its length, to expand the skirt.

5. A piston expander for a piston skirt with a wrist pin mounted in said skirt comprising a relatively rigid arm formed with an offset intermediate portion to partially encircle said wrist pin mounting, wall engaging elements at each end of the arm each of said wall engaging elements having portions constructed and arranged to provide a seat for the adjacent end of said arm, and being provided with portions adapted to contact the piston at points above and below the center line of the arm to expand said skirt.

6. A piston expander including an arm, means for pivotally associating one end of said arm with the piston skirt, means for moving said arm in the direction of its length, and fixedly associating the other end of said arm with said piston comprising a plate formed with a slot through which the said other end of said arm extends, said plate having spaced lateral projecting portions for engaging the piston wall at spaced points, and a follower carried by said plate and engaging the wall portions adjacent said slot, said follower being shiftable to contact the end portion of the arm extending through said slot to move said arm on its pivot in the plane of the axis of the piston.

7. In a piston having a head and an expansible skirt, an expander for said piston including an arm of arcuate form arranged diagonally between the head and skirt, said arm having an inclined end formation adapted to set as a wedge, means for pivotally associating the lower end of said arm and the inner skirt wall, and means interposed between the upper end of said arm and said piston head, said last named means including an element movable longitudinally of the piston and adapted to contact said inclined end so as to wedge the adjacent arm extremity to apply a tension to the arm for readily expanding the piston skirt.

8. In a piston expander, a brace member adapted to be arranged diagonally within a piston for increasing the diameter of the piston skirt from a fixed point within the piston head, said brace being bent upwardly intermediate its length and including a web and a side wall portion and having its upper end inclined to receive expansible forces directed from the adjacent portion of the piston head.

9. An expander for a piston having a head and an expansible skirt, said expander including a pair of pressure applying elements and an interposed arm, one of said pressure applying elements engaging portions of said piston head and skirt and the other pressure applying element being fixedly positioned within the skirt, and diagonally arranged with respect to the first pressure applying element, upper and lower inclined faces formed at one end of the arm and positioned adjacent the head engaging pressure applying element, and means engaging said inclined faces and carried by said last named pressure applying element for moving said arm to expand said piston skirt.

10. An expander for a piston having a head and an expansible skirt, said expander including a pair of pressure applying elements for engaging the inner face of said skirt at spaced points, an adjustable member carried by one of said elements, an arm interposed between said elements, said arm having one end pivotally associated with one of said elements and its other end provided with inclined faces for engaging one of said elements and the adjustable member carried thereby, whereby rectilinear movement of said arm may be caused by movement of said adjustable member for increasing the diameter of said skirt.

11. An expander for pistons having a head and an expansible skirt, a pair of seat members, each having a head engaging element and a skirt engaging element, an arm interposed between said seat members, and a movable member carried by said head engaging seat member for moving said arm in a direction to transmit lateral forces to said skirt engaging member.

12. An expander for pistons having a head and an expansible skirt, a pair of seat members, each having a head engaging element and a skirt engaging element, an arm interposed between said seat members, said arm being formed with a face inclined from the horizontal, and a movable member carried by one of said members for engaging said inclined face to exert skirt expanding forces through said arm to the skirt engaging member.

13. An expander for a piston having a head portion and an expansible skirt, including a pressure applying member having a part for engaging a portion of the skirt wall, a second pressure applying member engaging portions of said head and skirt and including an adjustable element, and a connecting arm, said arm having one end portion pivotally engaging said pressure applying member, and its other end so constructed and arranged as to cooperate with the adjustable element of said second member to apply lateral force to one of said pressure applying members to cause said skirt to expand upon movement of said adjustable element.

14. An expander for a piston having a head and an expansible skirt, said expander including a pair of pressure applying elements for engaging the inner face of said skirt at spaced points, a member carried by one of said elements and adjustable in the direction of the axis of said piston, an arm interposed between said elements and having its extremities terminating above and below a horizontal plane passing through the skirt of said piston, one end of said arm being pivotally connected with one of said plates, and a portion of the opposite end of said arm engaging said adjustable member, whereby said arm may be shifted to exert lateral forces to said pressure applying elements to cause expansion of said skirt.

15. An expander for a piston having a head and an expansible skirt, said expander including a pair of pressure applying elements and an interposed arm, one of said pressure applying elements engaging portions of said piston head and skirt, an adjustable member carried by one of said pressure applying elements and movable axially of said piston, and means for shifting said arm to cause lateral movement of said pressure applying elements by movement of said adjustable member.

16. An expander for a piston having a head and an expansible skirt, said expander including a plate for engaging said skirt, an arm pivotally connected to said plate and extending upwardly in a plane at an angle to the axis of the piston to terminate at its upper end adjacent the piston wall, a bracket abutting the head of said piston and including an adjustable member, and means for camming the upper end of said arm to move the same toward a horizontal plane by movement of said adjustable member to urge said plate laterally to expand said skirt.

17. In combination, a piston having a head and an expansible skirt, means for expanding said skirt including an arm having one end portion pivotally engaging an anchor member fixedly positioned against the inner wall of said skirt and its other end terminating adjacent said head portion, a bracket interposed between the said other end of said arm and said head, and means carried by said bracket and engaging the said other end portion of said arm for moving said arm to apply pressure to said anchor member to expand said skirt.

18. In combination, a piston having a head and an expansible skirt, and means for expanding said skirt including an arm having one end portion pivotally engaging an anchor member fixedly positioned against the inner wall of said skirt and its other end terminating adjacent said head portion, a bracket interposed between the said other end of said arm and said head, and means carried by said bracket and engaging the said other end portion of said arm to cause said arm to exert lateral pressure against said anchor member and bracket to expand said skirt.

19. A piston expander for a piston having a head and an expansible skirt, an anchor member fixed to the wall of said skirt, a bracket abutting the piston head and having a depending portion overlying the adjacent marginal portion of the skirt, a link interposed between said bracket and anchor member, and means carried by and movable independent of said bracket in the direction of the axis of said piston and engaging the end portion of said link to urge said bracket and anchor member laterally to expand said skirt.

20. An expander for a piston having head and skirt portions and formed with wrist pin bosses, members engaging the skirt above and below the axis of said bosses, a link interposed between said members and pivotally associated with the lower member, and means movable between the upper member and the upper end portion of said link for urging said members radially to cause said skirt to expand.

JOSEPH SUNNEN.